United States Patent [19]

Pringle

[11] 4,102,032
[45] Jul. 25, 1978

[54] METHOD OF FABRICATING FURNITURE SPRING SUPPORT

[75] Inventor: William L Pringle, Grosse Pointe Shores, Mich.

[73] Assignee: United States Steel Corporation, Pittsburgh, Pa.

[21] Appl. No.: 746,836

[22] Filed: Dec. 2, 1976

[51] Int. Cl.² .................. B21D 39/00; B23P 11/00
[52] U.S. Cl. .................................. 29/520; 5/248; 267/100
[58] Field of Search ............... 267/100; 5/248, 256, 5/264 R, 351, 266, 275; 29/513, 520, 509

[56] References Cited

U.S. PATENT DOCUMENTS

| 1,460,145 | 6/1923 | Seiss | 29/513 X |
| 3,750,201 | 8/1973 | Usami | 5/248 X |
| 3,858,862 | 1/1975 | Ciampo et al. | 5/248 X |

Primary Examiner—Charlie T. Moon
Attorney, Agent, or Firm—McGlynn and Milton

[57] ABSTRACT

A furniture assembly, such as a metal box spring assembly, including slats defining support members for a plurality of coil springs. An aperture is formed in the metal support slat with an upset portion disposed about the periphery of the aperture and out of the plane of the support member and the tail of the coiled spring is inserted into the aperture and thereafter the upset portion is flattened toward the plane of the support member to force the periphery of the aperture into gripping engagement with the tail of the coil spring to retain the coil spring to the support member. The upset portion has a groove therein for receiving a radially extending support portion of the coil spring for receiving and positioning the radially extending support portion of the coil spring thereby positioning the entire spring.

6 Claims, 5 Drawing Figures

U.S. Patent  July 25, 1978  4,102,032
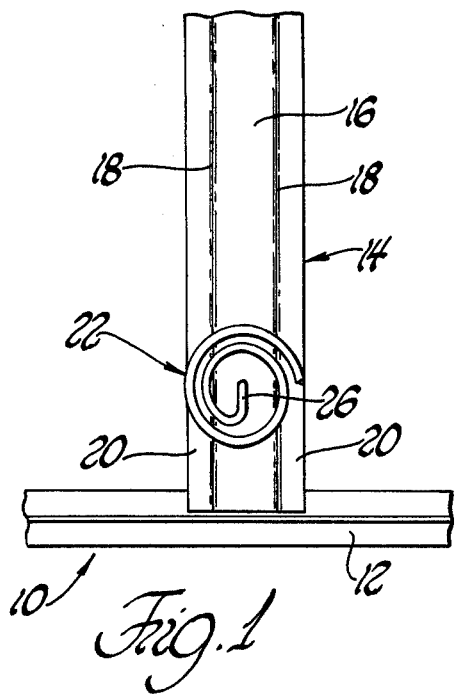
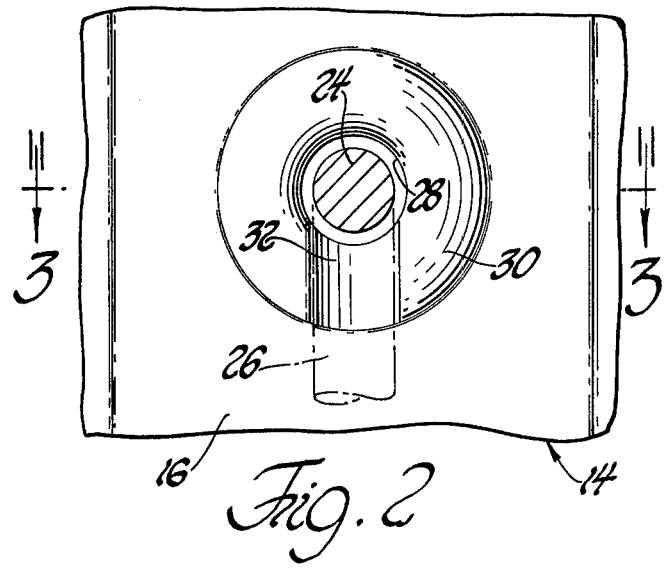
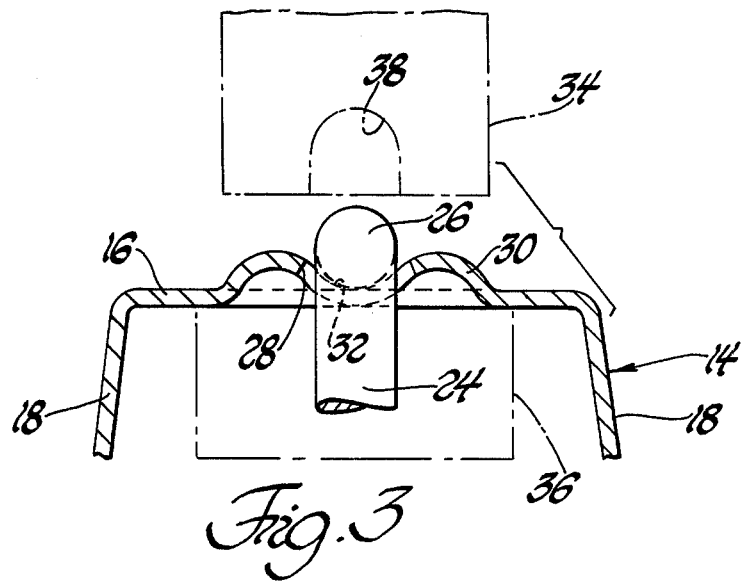
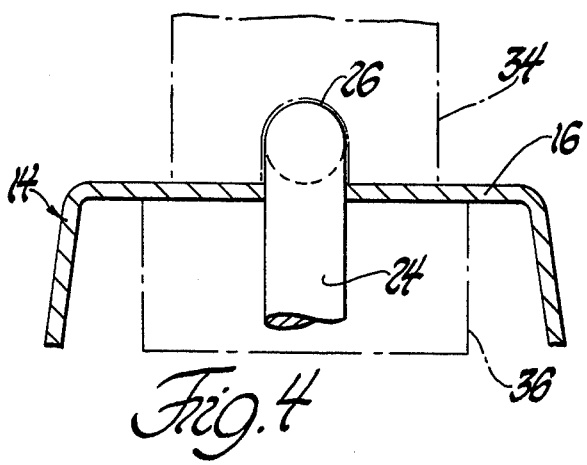
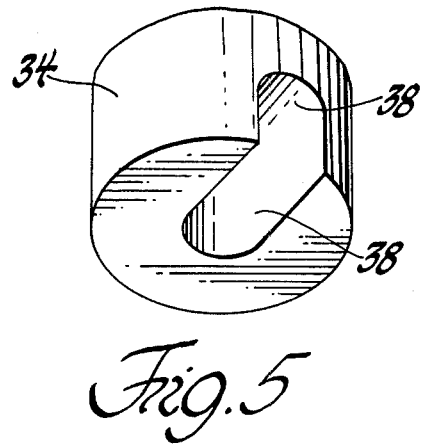

METHOD OF FABRICATING FURNITURE SPRING SUPPORT

The subject invention relates to a furniture spring support and the method of fabrication. More specifically, the subject invention relates to a retention means utilized in metal members of a furniture assembly, such as a box spring assembly, for receiving and retaining a coil spring in position. Coil springs of the type with which the instant invention is utilized typically include a plurality of coils which increase in diameter from the bottom to the top. The bottoms of the springs are secured to support members in the furniture assembly for retaining each individual spring in position. The objective of any attachment or securing means for such coil springs is to securely retain the springs in position yet provide easy attachment of the spring to the support member. Examples of prior art spring attachment systems are shown in the U.S. Pats. to Herider et al Nos. 2,737,666, granted Mar. 13, 1956; Wetzler 2,773,271, granted Dec. 11, 1956 and Ciampa et al 3,858,862, granted Jan. 7, 1975.

In accordance with the subject invention, there is provided an improved retention means for retaining the coil spring in a furniture assembly to a support member thereof and a method of accomplishing same. More specifically, the support member is provided with an aperture surrounded at least in part by an upset portion disposed out of the plane of the support member with the tail of the coil spring inserted into the aperture and thereafter the upset portion flattened to force the periphery of the aperture into gripping engagement with the tail of the coil spring.

Other advantages of the present invention will be readily appreciated as the same becomes better understood by reference to the following detailed description when considered in connection with the accompanying drawings wherein:

FIG. 1 is a fragmentary plan view of a furniture assembly constructed in accordance with the subject invention;

FIG. 2 is an enlarged fragmentary cross-sectional view taken immediately above the spring-retaining aperture before it is moved into gripping engagement with the tail of the spring;

FIG. 3 is a cross-sectional view taken substantially along line 3—3 of FIG. 2;

FIG. 4 is a view similar to FIG. 3 after the retaining means has been moved into gripping engagement with the tail of the spring; and FIG. 5 is a fragmentary perspective view showing the lower end of a die utilized for moving the periphery of the aperture into gripping engagement with the tail of the coil spring.

A furniture assembly comprising a metal box spring assembly is generally shown at 10 in FIG. 1. The box spring assembly includes a side rail 12 with a transversely extending slat member generally indicated at 14 secured thereto. The rail member 12 is stamped from sheet metal as is the slat member 14. The rail member 12 as well as the slat member 14 are more specifically described in copending application Ser. No. 610,699, filed Sept. 5, 1975, in the name of Applicant. Generally, each slat member 14 includes a top base 16 and diverging sides 18 which terminate in flanges 20 at their lower ends. As will be appreciated, a plurality of slats 14 are associated with each bed frame to support a plurality of coil springs, one of which is generally indicated at 22.

Each coil spring 22 includes a plurality of coils with the uppermost coil having a larger diameter than the lowermost or bottom coil. Each coil spring includes an axially-extending tail 24 which is connected to the bottom coil of the coil spring by a radially-extending support portion 26.

As best illustrated in FIGS. 2 and 3, there is included a spring retainer means disposed in the slat 14 comprising an aperture 28 with an upset portion 30 disposed about the aperture 28. The upset portion 30 comprises a rounded or arcuate ridge extending about the aperture and raised above or out of the plane of the support member defined by the base 16 of the slat 14. The upset portion 30 is arcuate from a position radially outwardly from the aperture upwardly and then downwardly to the periphery of the aperture. The aperture 28 and the upset portion 30 are made simultaneously by a punch die.

The upset portion 30 extends completely about the aperture 30 except for a groove 32 which extends radially from the aperture through the upset portion 30 for receiving and positioning the radially extending support portion 26 of the coil spring.

The tail portion 24 of the spring member is disposed in the aperture 28 as illustrated in FIGS. 2 and 3 and the aperture 28 is larger in diameter than the tail portion 24 so that the tail portion 24 is easily inserted into the aperture 28. The support portion 26 of the coil spring rests within the groove 32 for properly positioning the spring relative to the slat or support member 14. In other words, the aperture 28 is sufficiently larger than the tail portion 24 of the spring to allow the tail portion 24 to be withdrawn therefrom once it is inserted thereinto.

As illustrated in phantom in FIGS. 3 and 4 and in full lines in FIG. 5, there is included die means comprising an upper die 34 and a lower die 36 for flattening the upset portion 30 to force the periphery of the aperture 28 into a smaller diameter and gripping engagement with the tail 24 of the coil spring 22. The upper die 34 includes a recess 38 for receiving the support portion 26 of the spring whereby the end of the upper die 34 engages the upset portion 30 about the aperture 28 except in the area of the groove 32.

As the two dies 34 and 36 are moved together they clamp the rounded ridge or upset portion 30 to move the upset portion 30 toward the plane of the remainder of the support portion 16 to force the periphery of the aperture into gripping engagement with the coil spring. The area of the metal about the aperture 28, after it has been moved to the position illustrated in FIG. 4, has stresses therein as a result of the flattening of the upset portion 30 about the aperture 28 to reduce the periphery or diameter of the aperture so that it moves into gripping engagement with the tail 24 of the spring 22. Said another way, the metal surrounding the aperture when it is in gripping engagement with the tail of the spring, as illustrated in FIG. 4, has been worked.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that the invention may be practiced otherwise than as specifically described herein and yet remain within the scope of the appended claims.

The embodiments of the invention in which an exclusive property or privilege is claimed are defined as follows:

1. A method of attaching a coil spring to a support member of a furniture assembly when the coil spring includes a bottom coil and a radially extending support portion interconnecting the bottom coil and an axially extending tail, said method comprising the steps of forming an aperture in said support member and an upset portion disposed about at least a portion of the periphery of the aperture and out of the plane of the support member, inserting said tail of said spring into said aperture, and flattening the upset portion toward the plane of the support member to force the periphery of the aperture into gripping engagement with the tail of the coil spring.

2. A method as set forth in claim 1 further defined as forming a groove in the upset portion for receiving and positioning the support portion of the spring.

3. A method as set forth in claim 1 further defined as flattening the upset portion by clamping same between two dies.

4. A method as set forth in claim 1 further defined forming the upset portion as a rounded ridge extending about the aperture.

5. A method as set forth in claim 4 further defined as forming a groove in the upset portion for receiving and positioning the support portion of the spring.

6. A method of attaching a coil spring to a support member having an upset portion disposed about an aperture therein and out of the plane of the support member when the coil spring includes a radially extending support portion interconnecting the bottom coil and an axially extending tail, said method comprising the steps of; engaging the upset portion with a die having a recess therein disposed about the radially extending support portion and flattening the upset portion toward the plane of the support member to force the periphery of the aperture into gripping engagement with the tail of the coil spring.

* * * * *